US008756139B2

(12) United States Patent
Glinberg et al.

(10) Patent No.: US 8,756,139 B2
(45) Date of Patent: *Jun. 17, 2014

(54) OPTION PRICING MODEL FOR EVENT DRIVEN CALL AND PUT OPTIONS

(75) Inventors: Dmitriy Glinberg, Northbrook, IL (US); Feliks Landa, Glenview, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/229,237

(22) Filed: Sep. 9, 2011

(65) Prior Publication Data

US 2012/0041892 A1 Feb. 16, 2012

Related U.S. Application Data

(63) Continuation-in-part of application No. 12/245,448, filed on Oct. 3, 2008, now Pat. No. 8,036,972.

(51) Int. Cl.
*G06Q 40/00* (2012.01)

(52) U.S. Cl.
USPC .................................................. 705/36 R

(58) Field of Classification Search
USPC .............................................. 705/36 R, 37, 5
See application file for complete search history.

(56) References Cited

U.S. PATENT DOCUMENTS

| | | | |
|---|---|---|---|
| 6,064,985 A | | 5/2000 | Anderson |
| 7,536,334 B1 * | | 5/2009 | Daughtery, III ............ 705/36 R |
| 7,966,242 B1 | | 6/2011 | Topitzer |
| 2001/0032168 A1 | | 10/2001 | Adamson et al. |
| 2002/0099640 A1 | | 7/2002 | Lange |
| 2005/0160027 A1 | | 7/2005 | Thomas |
| 2005/0209959 A1 * | | 9/2005 | Tenney ............................ 705/39 |
| 2010/0005031 A1 | | 1/2010 | Brody et al. |
| 2010/0088209 A1 | | 4/2010 | Glinberg et al. |

OTHER PUBLICATIONS

Kim, Kyoung-Kuk, Ph.D., Affine processes in finance: Numerical approximation, simulation and model properties; 2008, 202 pages AAT 3333483.
Kau, James B; An option-theoretic model of catatrophes applied to mortgage insurance; Journal Risk and Insurance; Malvem: Dec. 1996, vol. 63, Is. 4; p. 639, 18 pgs.
Cai, Ning, Ph.D., Jump diffusion process in financial modeling, Columbia University, 2008, 223 pages; AAT 3333311.
International Search Report from International Application No. PCT/US12/53763—2 pages.
International Search Report from International Application No. PCT/US12/53763, (2012).

* cited by examiner

*Primary Examiner* — Hani M Kazimi
*Assistant Examiner* — Hatem M Ali
(74) *Attorney, Agent, or Firm* — Banner & Witcoff, Ltd.

(57) ABSTRACT

Systems and methods are provided for valuing event driven option contracts. A jump diffusion based model, such as a Merton jump diffusion based model, is modified to assume arithmetic movement of an underlying price and a single jump. The arithmetic movement of the underlying price may be modeled with a Bachelier based arithmetic model. Calculated values may be used to determine margin account requirements.

20 Claims, 3 Drawing Sheets

OPTION PRICING MODEL FOR EVENT DRIVEN CALL AND PUT OPTIONS

The present application is a continuation-in-part of U.S. patent application Ser. No. 12/245,448 filed Oct. 3, 2008. The entire disclosure of which is hereby incorporated by reference.

FIELD OF THE INVENTION

The present invention relates to methods and systems for valuing event driven option contracts.

DESCRIPTION OF THE RELATED ART

Options contracts or options give their owners the right but not the obligation to buy, in the case of call options, or to sell, in the case of put options, an underlying good, such as a company's stock or bond, at a specified "strike" price for a preset amount of time. When the preset amount of time has lapsed, the option "expires."

Event driven option contracts vary or scale the payment made by the seller or writer of the contract to the buyer depending on how far an event results from the "strike." If the event or strike on which an event driven option contract is based is whether the Board of Governors of the Federal Reserve will raise an interest rate, the seller only pays the buyer if the Board of Governors of the Federal Reserve raise the interest rate, in which case the event driven option contract is in the money. The payout under the event driven option contract scales and may be proportionate to the amount of the increase.

Traders, exchanges and other entities determine values for event driven option contracts for a number of purposes. Traders often value event driven option contracts when making buy and sell decisions. Exchanges and clearing firms value event driven option contracts when determining margin requirements. Calculating the value of an event driven option contract can be difficult when the option contract has not traded recently or frequently.

Prior art approaches to valuing event driven option contracts included analytical models and simulation based models that use values of underlying financial instruments. The performance of previous analytical models degrades as event driven option contracts become more complex. Simulation models require excessive processing requirements. The value of an event driven option contract may change as the value of the underlying product changes. The use of simulation models becomes more impractical when the value of the underlying financial instrument changes frequently.

Therefore, there is a need in the art for improved analytical systems and methods for valuing event driven option contracts.

SUMMARY OF THE INVENTION

Embodiments of the present invention overcome problems and limitations of the prior art by providing systems and methods for valuing event driven option contracts that use a jump diffusion based model that assumes arithmetic movement of an underlying price and a single jump. The jump diffusion model may be based on the Merton jump diffusion model. The arithmetic movement of the underlying price may be modeled with a Bachelier based arithmetic model. In various embodiments calculated event driven option contract values may be used, for example, when making buy and sell decisions and setting margin requirements.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION OF THE INVENTION

Figure 1:
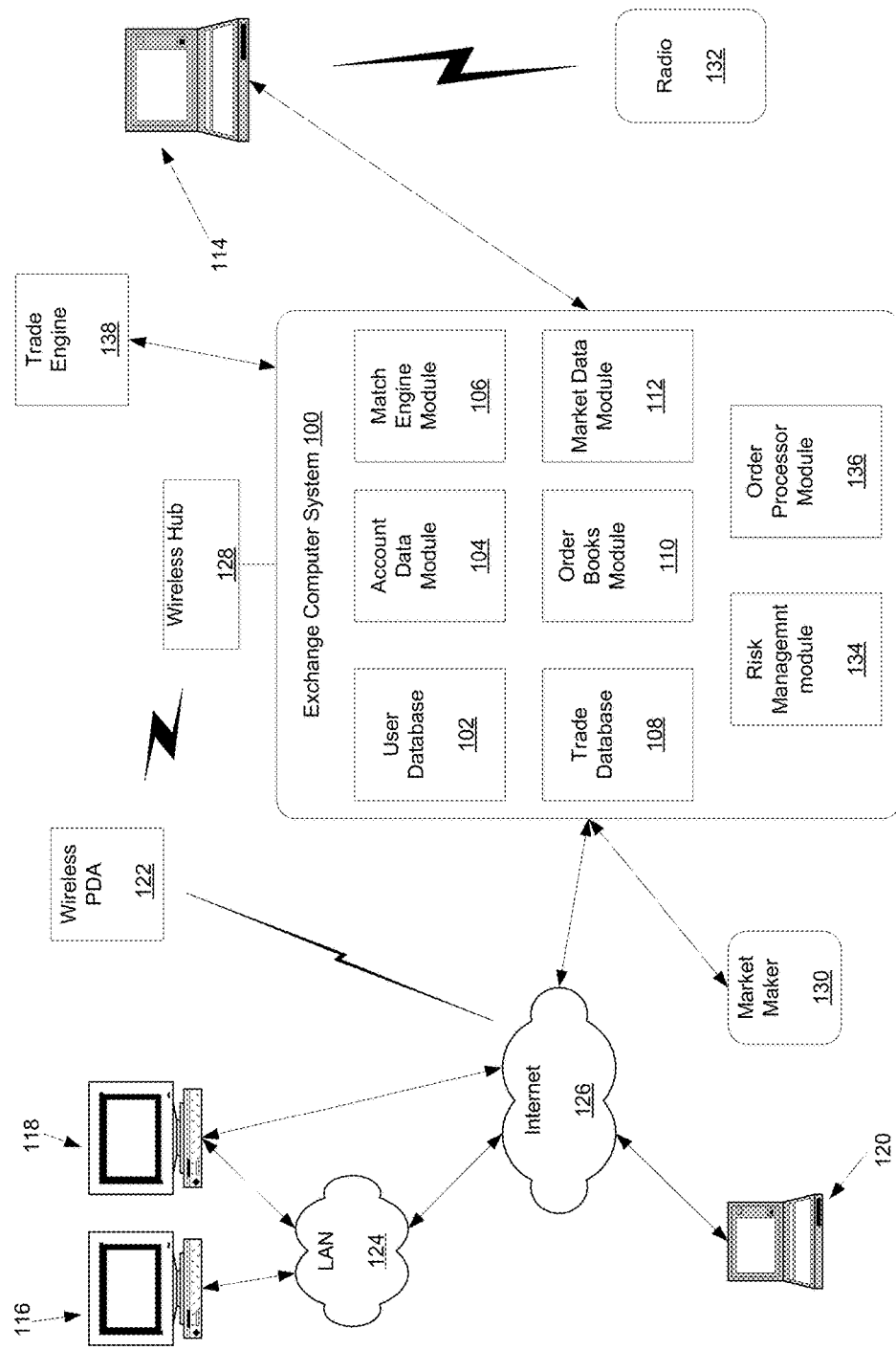
FIG. 1 shows a computer network system that may be used to implement aspects of the present invention.

Aspects of the present invention may be implemented with computer devices and computer networks that allow users to perform calculations and exchange information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords potentially with other information to identify users uniquely or collectively. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose variable defined derivative product and aggregate order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
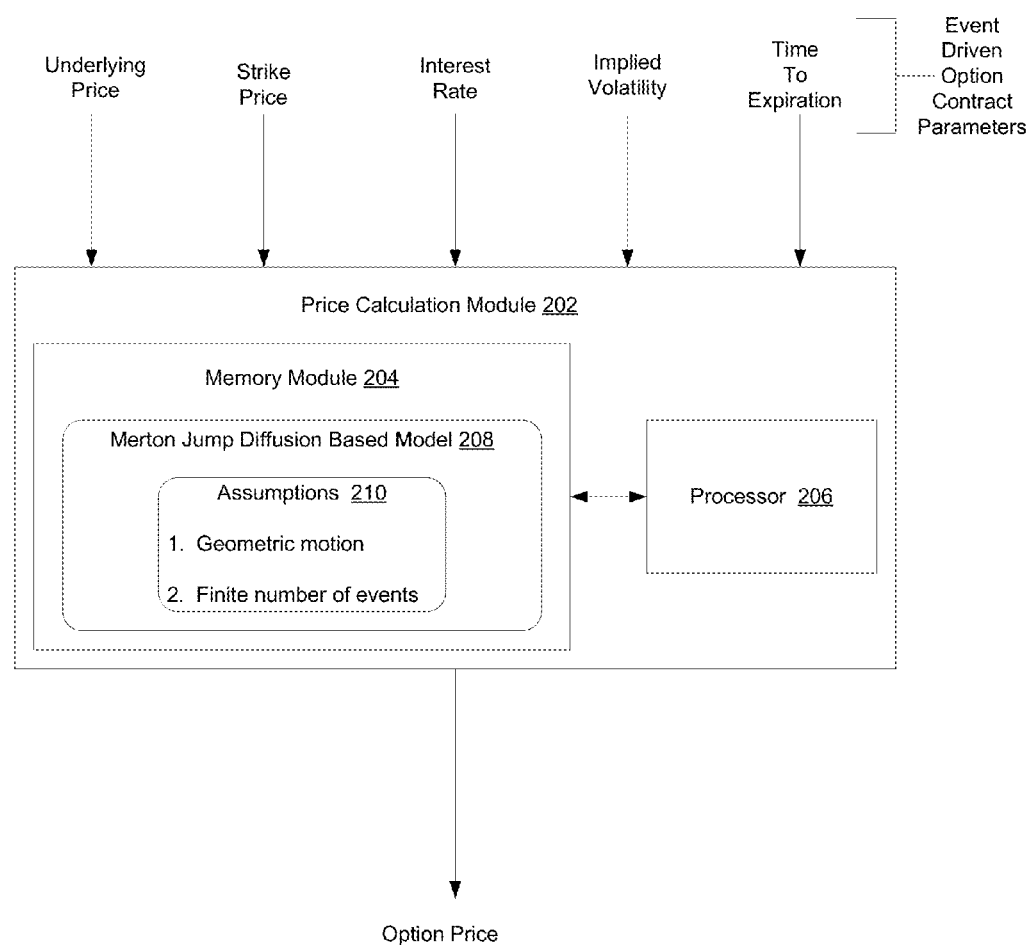
FIG. 2 illustrates a price calculation module that may be used to calculate a value or price of an event driven option contract, in accordance with an embodiment of the invention.

FIG. 2 illustrates a price calculation module 202 that may be used to calculate a value or price of an event driven option contract, in accordance with an embodiment of the invention. Price calculation module 202 may include a memory module 204 and a processor 206. Price calculation module 202 may be located at an exchange, such as at exchange computer system 100 (shown in FIG. 1), at a trader workstation remote from an exchange or at any other location that users desire to value event driven option contracts. Memory module 204 may be implemented with one or more physical or magnetic memory devices, such as a disk drive, magnetic memory, optical disk or other device used to store computer-executable instructions. In one embodiment, memory module 204 is implemented with a random access memory RAM of processor 206.

Memory module 204 includes a model used to value event driven option contracts. The model may be a Merton jump diffusion based model 208 that includes assumptions 210. Assumptions 210 may include geometric motion of the price of an underlying financial instrument and a finite number of events, such as one event. An exemplary model is described in detail below.

The Merton jump diffusion model generically describes underlying price motion as geometric movement dS/S in an underlying instrument S driven by a composite of the 2 independent processes:
1—time continuous diffusion (Brownian) motion with annualized variance ($\sigma^2$) cumulative over time to expiration (t) modeled by Wiener process dz, and
2—event driven Poisson process dρ (converging to Binomial process at limit) with jump variance ($\delta^2$)

$$dS/S = r*dt + \sigma*dz + \delta*d\rho, \qquad \text{(equation 1)}$$

where r is expected return rate, $dz=\epsilon*\sqrt{dt}$, dρ=1 or 0 (with probability p or 1−p)
ε—normal variable, dt—small increment of t—time to expiration The total variance over time t, conditioned on discrete number (n) of jumps is a sum of diffusion variance and event driven jumps (n) variance $$s^2 t = \sigma^2 t + \delta^2 * n \qquad \text{(equation 2)}$$

The Merton European call model is a pricing option value (G) with strike K as a sum of the Black-Scholes (B-S) option values $g_n$ weighted with probabilities ($w_n$) of randomly timed jumps (n) generated in economic events (m) from a poisson distribution. Underlying price and strikes must be positive to fit geometric process assumption.

$$G = \sum_{n=0}^{m->\infty} w_n g_n(S, K, s(n), t) \qquad \text{(equation 3)}$$

where $w_n$ probabilities (weights) of n jumps occurrence follow Poisson distribution converging to a binomial at limit when number of events (m) is large $$w_n = e^{-v} * v^n / n! = \lim_{m->\infty} m!/(m-n)! * n! * p^n * (1-p)^{m-n} \qquad \text{(equation 4)}$$

expected number of jumps v=p*m, p is probability of the jump (jump rate)
$g_0$ Is intrinsic value set as max (S−K, 0) at n=0 (no jumps),
$g_n = e^{-r*t}(S*N(d)*e^{rt} - K*N(d-s\sqrt{t}))$—is a Black-Scholes value with volatility (s) generated in n>0 jumps and option moneyness $d=[\ln(S/K)+(r+s^2/2)*t]/(s\sqrt{t})$, $N()$ is normal cumulative distribution In accordance with an embodiment of the invention, the Merton jump diffusion model is extended to value or price event driven option contracts with jumps timed deterministically rather than randomly and underlying and strike prices limited to a positive range to fit geometric process assumption. We first reduce an underlying event driven Poisson process to a binomial one. Then the option value is a weighted sum of intrinsic value and Black-Scholes option values with volatility rates generated in event driven n>0 jumps $$G = \sum_{n=0}^{m} w_n g_n, \qquad \text{(equation 5)}$$

Reducing total variance to events driven variance only by setting diffusion variance to 0 in event driven auction markets $$\sigma^2 = 0 \qquad \text{(equation 6)}$$

results in
$g_n = e^{-rt}*(S*N(d)-K*N(d-\delta\sqrt{n}))$—is Black-Scholes value with volatility (s) generated in n>0 jumps
and option moneyness d $$d=[\ln(S/K)+\delta^2/2*n]/\delta\sqrt{n} \qquad \text{(equation 8)}$$

The Merton jump diffusion model is adapted with a Black-Scholes model with the number of jumps (n) serving as approximation for the time to expiration (t). Finally, in the event based auction markets there is generally only one deterministically scheduled economic event (m=1) so that $$G=w_0 g_0+w_1 g_1, \text{ where } w_0=1-p \text{ and } w_1=p \qquad \text{(equation 9)}$$

and the probability rate of a jump (p) is the only tune up parameter.

In accordance with an embodiment of the invention, the Merton jump diffusion model is modified with a Bachelier based arithmetic motion model. The Merton European call jump diffusion model assumes geometric underlying process and computes option value as a composite sum of Black-Scholes option prices $g_n$ with volatility based on both diffusion and event driven jumps. The Bachelier model assumes arithmetic motion in the underlying instrument process driven by diffusion.

$$dS=\sigma*dz \qquad \text{(equation 10)}$$

and the Bachelier model computes a European call option as:

$$a=e^{-rt}*(s*\sqrt{t}*(d*N(d)+N'(d))), \qquad \text{(equation 11)}$$

s is volatility
and option moneyness d $$d=(S-K)/(s\sqrt{t}), N'(d)=n(d)=e^{-d^2/2}/\sqrt{2\pi}\text{—is normal density distribution} \qquad \text{(equation 12)}$$

The generic Merton jump diffusion model is modified to price scheduled event driven option contracts with deterministically timed jumps and a Bachelier based approach to underlying arithmetic motion. In presence of event driven jumps, underlying arithmetic motion approximation dS has both diffusion and jump components and can be described as $$dS=\sigma*dz+\delta*d\rho \qquad \text{(equation 13)}$$

and $s^2$—total variance over time t includes both diffusion variance and event driven variance generated in n>0 jumps:

$$s^2 t=\sigma^2 t+\delta^2*n \qquad \text{(equation 14)}$$

Then the Bachelier value with both diffusion and event driven volatility generated in n>0 jumps is:

$$a_n=e^{-rt}*(s(n)\sqrt{n}*(d*N(d)+N'(d))) \qquad \text{(equation 15)}$$

Next, the geometric process in the Merton jump diffusion model is replaced with an arithmetic Bachelier based process. Then valuing an event driven option contract is a composite sum of Bachelier option prices $a_n$ with volatility based on Event driven n>0 jumps $$A = \sum_{n=0}^{m->\infty} w_n a_n \qquad \text{(equation 16)}$$

To model event based option contracts with jumps generated in underlying economic events, we reduce the Poisson process to a binomial process. Then the value is a weighted sum of intrinsic value and option values $a_n$ with volatility rates generated in event driven n>0 jumps $$A = \sum_{n=0}^{m} w_n a_n \qquad \text{(equation 17)}$$

Reducing diffusion variance $\sigma^2=0$ results in $a_n=e^{-rt}*(\delta\sqrt{n}*(d*N(d)+N'(d)))$ is Bachelier value with volatility generated in n>0 jumps (equation 18)

$a_0$—intrinsic value and option moneyness d $$d=(S-K)/(\delta\sqrt{n})$$

A number of jumps (n) may serve as an approximation for the time to expiration (t).

Finally, in embodiments that involve the event driven auction markets there is only one deterministically scheduled underlying economic event (m=1), so that $$A=w_0 a_0+w_1 a_1, \text{ where } w_0=1-p \text{ and } w_1=p \qquad \text{(equation 19)}$$

and probability rate of event jumps (p) is the tune up parameter.

Because of the underlying motion arithmetic assumption, underlying price and strikes are not limited to a positive range and could be positive, zero or negative as in trade deficit or non-farm payroll statistics related contracts in auction markets.

Traders and other entities often associate "Greek" values with risks. Each Greek estimates the risk for one variable: delta measures the change in the option price due to a change in the stock price, gamma measures the change in the option delta due to a change in the stock price, theta measures the change in the option price due to time passing, vega measures the change in the option price due to volatility changing, and rho measures the change in the option price due to a change in interest rates.

Delta, gamma, and vega formulas hold in both geometric (G) and arithmetic (A) pricing cases with t time to expiration being replaced by n—number of jumps and s—annualized volatility replaced by $\delta$—volatility per jump. So Greeks accounting for event driven jumps may be determined as follows:

Delta $\Delta_G=e^{-rt}*N(d)$ and $\Delta_A=e^{-rt}*N(d)$ (equation 20)

Gamma $\Gamma_G=e^{-rt}*N'(d)/(S*\delta\sqrt{n})$ and $\Gamma_A=e^{-rt}*N'(d)/(\delta\sqrt{n})$ (equation 21)

Vega $Y_G=e^{-rt}*S*N'(d)\sqrt{n}$ and $Y_A=e^{-rt}*N'(d)\sqrt{n}$ (equation 22)

$$Rho_G = e^{-rt**}X*n*N(d-\delta\sqrt{n}) \text{ and } Rho_A = -a_n*n \quad \text{(equation 23)}$$

Then, similar to options composite Greeks may be produced as weighted sums of Greek values conditioned on jumps generated with jump probability rate p.

$$Greek = \sum_{n=0}^{m} w_n Greek_n \quad \text{(equation 24)}$$

And for one deterministically scheduled underlying economic event (m=1) intrinsic $Greek_0=0$ and so $$Greek = w_1 Greek_1, \text{ where } w_1 = p \quad \text{(equation 25)}$$

Greeks jump rate parameter can be tuned up against Black-Scholes model determined Greeks and improve risk analysis when Black-Scholes model determined Greeks (i.e. Gamma) are overestimated at near expiration time.

Various embodiments of the invention may also utilize a modified Bachelier model to price (1) put and (2) put and call event based options. For example, the Bachelier model may be extended to price European style event based call options with δ—Event volatility replacing annualized volatility s so that:

$$c_1 = e^{-rt}*((S-K)*(N(d)+N'(d)*\delta)) \quad \text{(equation 26)}$$

where
d=(S−K)/δ
S=underlying price
K=strike price
r=interest rate
t=time to expiration Similarly, a Bachelier model can be adapted to price put event based options $$p_1 = e^{-rt}*((S-K)*(N(d)-1)+N'(d)*\delta) \quad \text{(equation 27)}$$

So either Call or Put option price is given as $$c_1 = e^{-rt}*(b*(S-K)*(N(b*d)+N'(d)*\delta)) \quad \text{(equation 28)}$$

where
b=1—for a call
b=−1—for a put
N(x) is Normal Cumulative distribution.

Binary cash-or-nothing options with Q fixed payoff may be modeled as follows. Note that N(b*d) is probability of option being at or in the money. Then Binary cash-or-nothing Price is a discounted expected value of receiving payout Q.

$$a_c = e^{-rt}*Q*N(b*d) \quad \text{(equation 29)}$$

To derive Greeks recall that derivative of Normal Cumulative distribution $$N'(x) = n(x) = e^{-x**2/2}/\sqrt{2\pi}\text{—is Normal density distribution} \quad \text{(equation 30)}$$

And Normal Cumulative and Density distributions partial derivatives are $$N_y(x) = n(x)*x_y \quad \text{(equation 31)}$$

$$n_y(x) = n(x)*(-x)*x_y \quad \text{(equation 32)}$$

where y=S or δ
Then Binary cash-or-nothing delta is $$\Delta a_c = e^{-rt}*b*Q*n(d)/\delta \quad \text{(equation 33)}$$

Binary cash-or-nothing gamma is $$\Gamma a_c = e^{-rt}*b*Q*n_s(b*d)/\delta = e^{-rt}*b*Q*n(d)*(-d)/\delta^2 \quad \text{(equation 34)}$$

Binary cash-or-nothing vega is $$Ya_v = e^{-rt}*b*Q*n(d)*(K-S)/\delta^2 = -e^{-rt}*b*Q*n(d)*d/\delta \quad \text{(equation 35)}$$

Binary cash-or-nothing rho is $$Ra_c = -a_c*t \quad \text{(equation 36)}$$

Binary cash-or-nothing theta is $$Ta_c = ra_c + e^{-rt}*b*Q*n(d)*0.5*d/t \quad \text{(equation 37)}$$

where event volatility $\delta = sS\sqrt{t}$.

Figure 3:
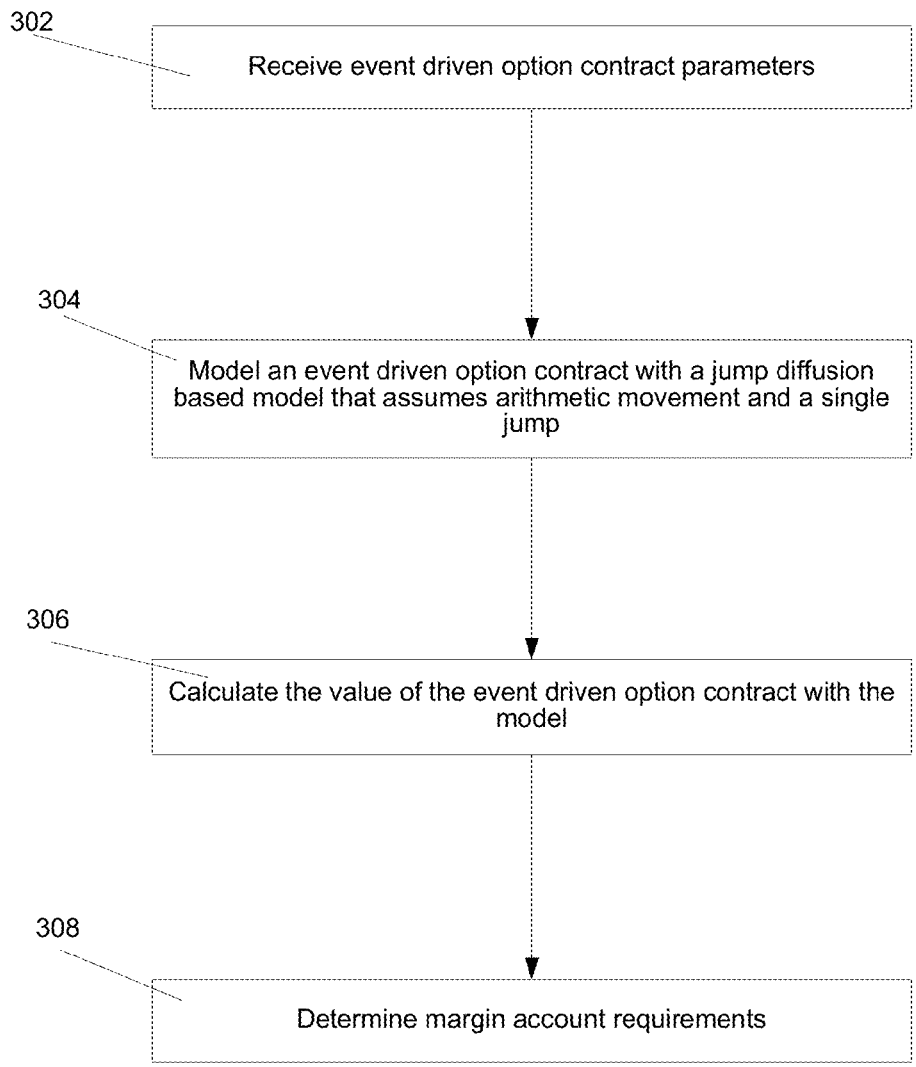
FIG. 3 illustrates a method for valuing an event driven option contract in accordance with an embodiment of the invention.

FIG. 3 illustrates a method for valuing an event driven option contract in accordance with an embodiment of the invention. The method shown in FIG. 3 may be implemented with one or more computer devices. In step 302 event driven option contract parameters are received. As shown in FIG. 2, event driven option contract parameters may include an underlying price, strike price, interest rate, implied volatility, and time to expiration. In step 304 an event driven option contract is modeled with a jump diffusion based model that assumes arithmetic movement of the price of an underlying product and a single jump. The modeling of event driven option contracts has been described in detail above.

Of course, one or more of the steps shown in FIG. 3 may be performed in an order different than shown. For example, in one embodiment, step 304 may be performed before step 302. In step 306, the value of the event driven option contract is calculated with the model that results from step 304. Once the value of the event driven option contract has been determined, a user or computer device may then perform a variety of additional steps. For example, in step 308 a margin account requirement may be determined Step 308 may involve using the value in a risk scenario calculation such as one used with the Standard Portfolio Analysis of Risk (SPAN) system, which is used for calculating margin requirements for futures and options on futures. In other embodiments of the invention, the value calculated in step 306 may be displayed on a display device and/or used by a user who is making a buy or sell decision.

The present invention has been described herein with reference to specific exemplary embodiments thereof. It will be apparent to those skilled in the art, that a person understanding this invention may conceive of changes or other embodiments or variations, which utilize the principles of this invention without departing from the broader spirit and scope of the invention as set forth in the appended claims. All are considered within the sphere, spirit, and scope of the invention.

We claim:

1. A computer-implemented method of valuing an event driven option, the method comprising:
   (a) storing in a memory module a model for the event driven option, the model comprising a jump diffusion based model that assumes arithmetic movement of an underlying price and a single jump; and
   (b) calculating by a processor the value of the event driven option with the model in (a);
   wherein the model for the event driven option determines an option price $c_1$ as:

$$c_1 = e^{-rt}*(b*(S-K)*(N(b*d)+N'(d)*\delta))$$

where
   r=interest rate
   t=time to expiration
   b=1 for a call option and −1 for a put option
   δ=event volatility
   S=underlying price
   K=strike price
   d=(S−K)/δ
   N(x)=normal cumulative distribution $N'(x) = e^{-x^{*2}/2}/\sqrt{2\pi}$.

2. The computer-implemented method of claim 1, wherein the event driven option is based on an interest rate.

3. The computer-implemented method of claim 2, wherein the interest rate is set by the Board of Governors of the Federal Reserve.

4. The computer-implemented method of claim 1, wherein a payout of the event driven option is proportionate to an amount of increase in an interest rate.

5. The computer-implemented method of claim 1, wherein the event driven option is based on a non-farm payroll report.

6. The computer-implemented method of claim 1, wherein (b) comprises determining the value of the event driven option contract from parameters that include underlying price, strike price, risk free interest rate, time to expiration and implied volatility.

7. The computer-implemented method of claim 1, further including determining a margin account requirement based at least in part on the value calculated in (b).

8. The computer-implemented method of claim 1, further including generating a report with a margin account requirement base on the value calculated in (b).

9. The computer-implemented method of claim 1, wherein the event driven option comprises a European style option.

10. The computer-implemented method of claim 1, wherein the jump diffusion model comprises a Merton jump diffusion model.

11. A non-transitory computer-readable medium containing computer-executable instructions for causing a computer device to perform the steps of:
(a) modeling an event driven option with a jump diffusion based model that assumes arithmetic movement and a single jump; and
(b) calculating the value of the event driven option with the model in (a)
wherein the model for the event driven option determines an option price $c_1$ as:

$$c_1 = e^{-rt} * (b*(S-K) * (N(b*d) + N'(d)*\delta))$$

where
r=interest rate
t=time to expiration
b=1 for a call option and −1 for a put option
δ=event volatility
S=underlying price
K=strike price
d=(S−K)/δ
N(x)=normal cumulative distribution
$N'(x) = e^{-x^{*2}/2}/\sqrt{2\pi}$.

12. The non-transitory computer-readable medium of claim 11, wherein the jump diffusion model comprises a Merton jump diffusion model.

13. The non-transitory computer-readable medium of claim 11, wherein a payout of the event driven option is proportionate to an amount of increase in an interest rate.

14. The non-transitory computer-readable medium of claim 13, wherein the interest rate is set by the Board of Governors of the Federal Reserve.

15. An apparatus that values an event driven option, the apparatus comprising:
a computer-readable memory module that contains a model of an event driven option, the model comprising a jump diffusion based model that assumes arithmetic movement and a single jump; and
a processor configured to receive event based option characteristic data and use the model of the event driven option to determine a value of the event driven option
wherein the model for the event driven option determines an option price $c_1$ as:

$$c_1 = e^{-rt} * (b*(S-K) * (N(b*d) + N'(d)*\delta))$$

where
r=interest rate
t=time to expiration
b=1 for a call option and −1 for a put option
δ=event volatility
S=underlying price
K=strike price
d=(S−K)/δ
N(x)=normal cumulative distribution
$N'(x) = e^{-x^{*2}/2}/\sqrt{2\pi}$.

16. The apparatus of claim 15, wherein a payout of the event driven option is proportionate to an amount of increase in an interest rate.

17. The apparatus of claim 16, wherein the interest rate is set by the Board of Governors of the Federal Reserve.

18. The apparatus of claim 15, wherein the processor is further configured to determine a margin account requirement based at least in part on the determined value of the event driven option.

19. The apparatus of claim 15, wherein the event driven option is based on a non-farm payroll report.

20. The apparatus of claim 15, wherein the jump diffusion model comprises a Merton jump diffusion model.

* * * * *